Jan. 3, 1961  D. EYRE  2,967,034
DELTA-WING AIRCRAFT CONSTRUCTION
Filed June 16, 1958  2 Sheets-Sheet 1
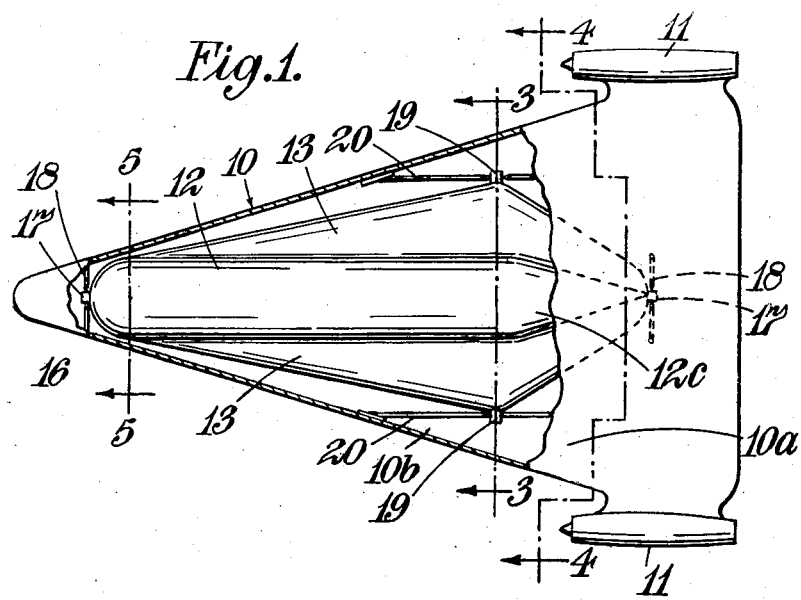
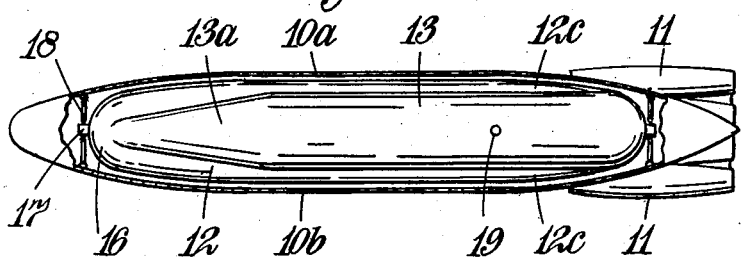
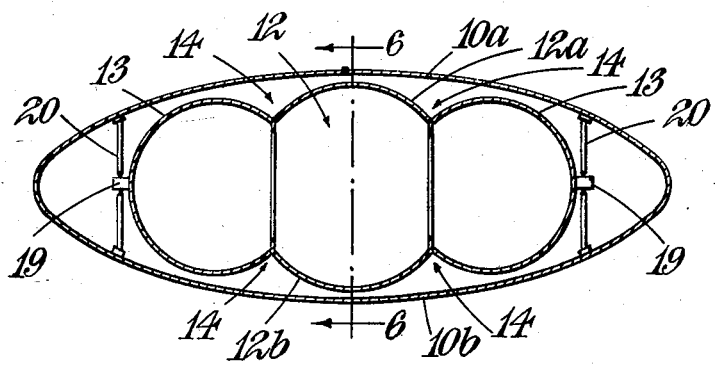

Jan. 3, 1961   D. EYRE   2,967,034
DELTA-WING AIRCRAFT CONSTRUCTION
Filed June 16, 1958   2 Sheets-Sheet 2
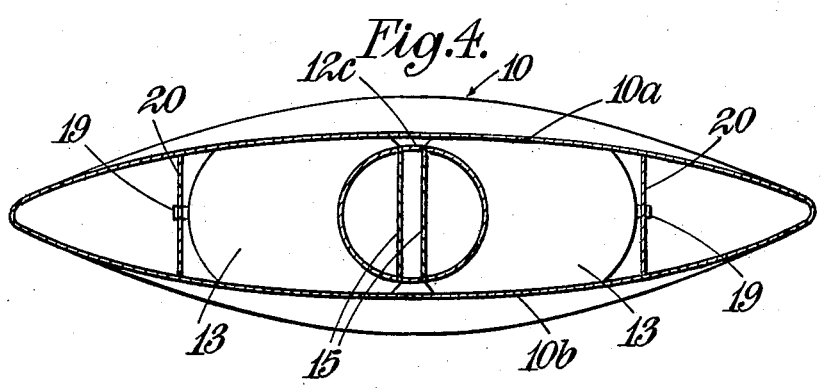
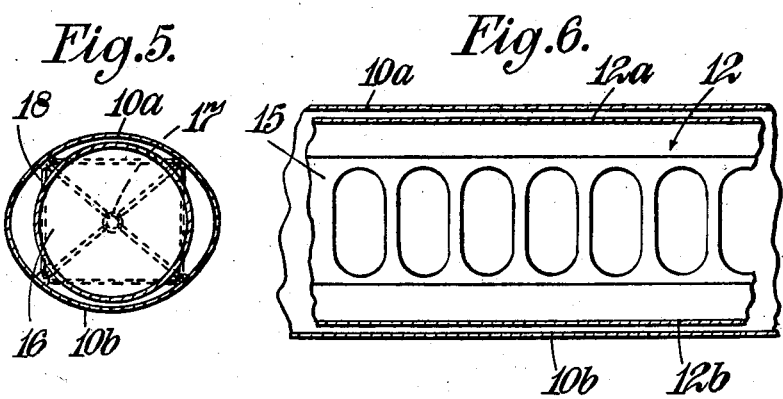
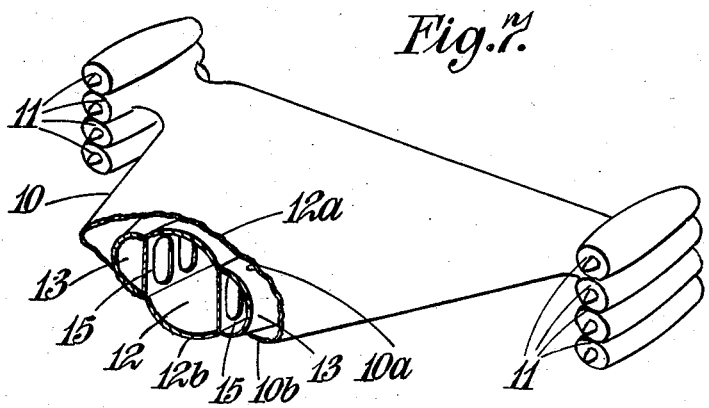

United States Patent Office 2,967,034
Patented Jan. 3, 1961

2,967,034

DELTA-WING AIRCRAFT CONSTRUCTION

Donald Eyre, Derby, England, assignor to Rolls-Royce Limited, Derby, England, a British company Filed June 16, 1958, Ser. No. 742,138

Claims priority, application Great Britain June 25, 1957

5 Claims. (Cl. 244—119)

This invention comprises improvements in or relating to aircraft, and is concerned with aircraft of the delta-type, that is aircraft which are approximately Δ-shape in plan.

According to the present invention, an aircraft of the delta-type comprises a main structure including the aircraft external skin, the main structure being of lenticular transverse cross-section over a major part of its length, and a closed cabin structure housed within the main structure and having an outer wall which has, over a major part of the length of the cabin structure, a transverse cross-section formed by a series of outwardly-convex arcs joined end to end, the radii of curvature of the arcs adjacent the longitudinal centre line of the aircraft being greater than the radii of curvature of the arcs of the lateral portions of the wall.

By such a construction, the capacity of the cabin structure can be increased as compared with say a cylindrical cabin whereof the diameter will be limited by the depth of the aircraft at its longitudinal centre line, whilst also a structure can be produced more adapted to withstand pressurizing loads as compared with say a lenticular cross-section cabin structure.

In one particular construction, the cabin structure has a central section having upper and lower walls in the form of like minor arcuate portions of a cylinder and a pair of lateral blister sections having transverse cross-sections which are major arcuate portions of cylinders of a diameter smaller than that of the central section and which meet the central section in cusp formations. The forward end of the cabin structure is hemispherical and the rearward end is roughly triangular in plan and comprises rearwardly tapering portions of the central and lateral blister sections.

According to a preferred feature of the invention, the cabin structure is mounted within the main structure through trunnion mountings at the forward and rear ends of the cabin structure, the axis of these mountings being parallel to the longitudinal axis of the aircraft, and through second laterally-disposed trunnion mountings whereof the axis is at right angles to the aircraft longitudinal axis.

One construction of aircraft of this invention is illustrated in the accompanying diagrammatic drawings in which:

Figure 1 is a plan view of the aircraft with parts broken away;

Figure 2 is a side elevation of the aircraft with parts broken away;

Figures 3, 4 and 5 are sections on the lines 3—3, 4—4 and 5—5 respectively of Figure 1, Figure 6 is a section on the line 6—6 of Figure 3, and Figure 7 is a perspective view of the rearward portion of the aircraft.

Referring to the drawings, the aircraft is a supersonic aircraft of the delta type and comprises a main structure 10 having upper and lower external skins 10a, 10b, the structure having a triangular plan (Figure 1) with one angle forming the nose of the aircraft and the base side opposite the nose forming the rear edge of the aircraft. The aircraft is jet propelled and the jet propulsion engines are shown as being provided in two vertical banks 11 at the ends of the rear edge of the aircraft. The main structure 10 is, as will best be seen from Figures 3, 4, 5 and 7, lenticular in transverse cross-section over the major part of the length of the aircraft.

The aircraft also comprises pressurized cabin structure having a multi-bubble transverse cross-section over the major part of its length. The cabin structure comprises a central portion 12 having an upper wall 12a and a lower wall 12b which are like opposite minor arc portions of a cylinder, a pair of lateral blister sections 13 which are arcuate in transverse cross-section and have at each transverse cross-section a radius of curvature less than the walls 12a, 12b of the central section. Over the major part of their length the transverse cross-sections of the blisters are major arcs of circles and they meet the central section in cusp formations 14 (Figure 3). The forward ends 13a of the blisters are tapered.

The lines of intersection of the central and blister sections are interconnected by suitable vertical walls or ties 15.

The forward end 16 of the cabin structure is hemispherical and the rearward ends of the central and blister sections are shaped to have a triangular plan, the rearward ends 12c of the walls 12a, 12b of the central section being tapered and having a decreasing radius of curvature and the rearward ends of the blister sections 13 being appropriately shaped.

The cabin structure is mounted in the main structure 10 through a series of trunnion mountings so that stresses in the main structure are not transmitted to the cabin structure.

The mounting arrangement comprises a first pair of trunnions 17 whereof the axes are aligned and parallel to the longitudinal axis of the aircraft, these trunnions being supported in braced frames 18 forming part of the main structure 10, and a second pair of aligned trunnions 19 whereof the axes are at right angles to the axes of trunnions 17 and which are mounted in braced frames 20.

I claim:

1. An aircraft of the delta type comprising a main structure including the aircraft external skin, the main structure being of lenticular transverse cross-section over a major part of its length, and a closed cabin structure housed within the main structure and having an outer wall which has, over a major part of the length of the cabin structure, upper and lower wall portions adjacent the longitudinal center line of the aircraft and lateral wall portions disposed on each side of the longitudinal center line interconnecting said upper and lower wall portions, each of said wall portions having a transverse cross-section which is an arc of a circle and the radii of curvature of the cross-sections of the upper and lower wall portions being greater than the radii of curvature of the cross-sections of the lateral wall portions.

2. An aircraft of the delta type comprising a main structure including the aircraft external skin, the main structure being of lenticular transverse cross-section over a major part of its length, and a closed cabin structure housed within the main structure and having a central section having upper and lower walls in the form of like minor arcuate portions of a cylinder and pair of lateral blister sections having transverse cross-sections which are major arcuate portions of cylinders of a diameter smaller than that of the central section and which meet the central section in cusp formations.

3. An aircraft according to claim 2 wherein vertical ties are provided between the cusp formations.

4. An aircraft according to claim 2, comprising a hemispherical forward end to the cabin structure and a rearward end which is roughly triangular in plan and comprises rearwardly tapering portions of the central and lateral blister sections.

5. An aircraft according to claim 1 comprising mounting means supporting the cabin structure within the main structure, said mounting means comprising trunnion mountings at the forward and rear ends of the cabin structure, the axis of these mountings being parallel to the longitudinal axis of the aircraft, and second laterally-disposed trunnion mountings whereof the axis is at right angles to the aircraft longitudinal axis.

References Cited in the file of this patent

UNITED STATES PATENTS

| | | |
|---|---|---|
| 2,236,482 | Zindel | Mar. 25, 1941 |

FOREIGN PATENTS

| | | |
|---|---|---|
| 110,433 | Great Britain | Oct. 25, 1917 |
| 613,774 | Great Britain | Dec. 2, 1948 |
| 1,000,522 | France | Oct. 17, 1951 |